(12) United States Patent
Derstadt (10) Patent No.: US 12,059,964 B2
(45) Date of Patent: Aug. 13, 2024

(54) CHARGING ADAPTER AND MOBILE POWER SUPPLY

(71) Applicant: Robert Theodore Derstadt, Highlands Ranch, CO (US)

(72) Inventor: Robert Theodore Derstadt, Highlands Ranch, CO (US)

(73) Assignee: Robert Theodore Derstadt, Highlands Ranch, CO (US)

( * ) Notice: Subject to any disclaimer, the term of this patent is extended or adjusted under 35 U.S.C. 154(b) by 312 days.

(21) Appl. No.: 17/547,139

(22) Filed: Dec. 9, 2021

(65) Prior Publication Data

US 2023/0182590 A1  Jun. 15, 2023

(51) Int. Cl.
```
B60L 53/16    (2019.01)
B60D 1/07     (2006.01)
B60L 53/18    (2019.01)
B60L 53/30    (2019.01)
```
(52) U.S. Cl.
CPC ............ B60L 53/16 (2019.02); B60D 1/075 (2013.01); B60L 53/18 (2019.02); B60L 53/30 (2019.02)

(58) Field of Classification Search
CPC .......... B60L 53/16; B60L 53/18; B60L 53/30; B60D 1/075
USPC ..................................................... 320/109
See application file for complete search history.

(56) References Cited

U.S. PATENT DOCUMENTS

| | | | | |
|---|---|---|---|---|
| 5,583,414 A * | 12/1996 | Lawrence | ............... | B63J 3/04 320/DIG. 34 |
| 5,764,025 A * | 6/1998 | Lehmann | ............ | H01M 50/176 320/105 |
| 6,636,014 B1 * | 10/2003 | Payne | ................. | H01M 6/5033 320/104 |
| 11,608,127 B1 * | 3/2023 | Vega | ........................ | B60D 1/64 |
| 11,780,280 B1 * | 10/2023 | Cardenas | ................. | B60D 1/62 280/422 |
| 2004/0017061 A1 * | 1/2004 | Roberts | .................... | B60D 1/60 280/507 |
| 2006/0027618 A1 * | 2/2006 | Williams | .................. | B60R 9/06 224/521 |

(Continued)

FOREIGN PATENT DOCUMENTS

| | | | | |
|---|---|---|---|---|
| CA | 3175644 A1 * | 3/2023 | ............... | B60D 1/64 |
| DE | 102010005425 A1 * | 8/2010 | ............... | B60D 1/06 |

(Continued)

OTHER PUBLICATIONS

DE-102010005425-A1 with Englisht translation.*
Duosida, "J1772 Electric Vehicle Charging Inlet Socket Vehicle Type 1 Connector 30/32 AMP," at least as early as Sep. 2021, URL=https://www.ebay.com/itm/194395085450, download date Sep. 13, 2022. (4 pages.).

*Primary Examiner* — Suresh Memula
(74) *Attorney, Agent, or Firm* — Seed IP Law Group LLP (57) ABSTRACT

A charging adapter includes a hitch adapter assembly including a tube that is received in a trailer hitch of a vehicle, a mounting plate coupled to the tube, and an electric vehicle socket coupled to the mounting plate. The electric vehicle socket receives power from an electric vehicle charging station. The hitch adapter assembly is coupled to a mobile or fixed power storage device in the vehicle via a wire or power cord. The power cord conveys power from the electrical vehicle charging station to the power storage device. The power storage device stores the power for use at a selected location and time.

18 Claims, 9 Drawing Sheets

(56) References Cited

U.S. PATENT DOCUMENTS

| | | | |
|---|---|---|---|
| 2010/0141201 A1* | 6/2010 | Littrell | H02S 40/32 |
| | | | 320/101 |
| 2013/0049327 A1* | 2/2013 | Bowe | B60D 1/64 |
| | | | 280/422 |
| 2013/0102162 A1* | 4/2013 | Holmes | H01R 13/629 |
| | | | 439/34 |
| 2013/0224969 A1 | 8/2013 | Sasaki et al. | |
| 2014/0017910 A1* | 1/2014 | Gerling | B60D 1/64 |
| | | | 439/35 |
| 2017/0240059 A1* | 8/2017 | Weicker | H02J 7/00302 |
| 2019/0123578 A1* | 4/2019 | Zenner | B60L 53/66 |
| 2019/0232992 A1 | 8/2019 | Bondaryk et al. | |
| 2022/0296042 A1* | 9/2022 | Currid | A47J 37/0763 |
| 2022/0371463 A1* | 11/2022 | Stubbs | H02J 7/0013 |
| 2023/0365209 A1* | 11/2023 | Yang | B60L 15/2036 |

FOREIGN PATENT DOCUMENTS

| | | | | |
|---|---|---|---|---|
| DE | 10 2012 203 856 A1 | | 9/2013 | |
| DE | 102012203856 A1 | * | 9/2013 | ............. B60D 1/246 |
| DE | 102012013653 A1 | * | 1/2014 | ............... B60D 1/64 |
| DE | 102012221282 A1 | * | 5/2014 | ........... G08B 13/126 |
| DE | 102014003672 A1 | * | 6/2015 | ......... H01R 13/6666 |
| DE | 102017212894 A1 | * | 1/2019 | |
| DE | 202021106965 U1 | * | 2/2022 | |
| DE | 102021125386 A1 | * | 3/2023 | ............. B60L 1/006 |
| EP | 1267453 A1 | * | 12/2002 | ............. H01R 13/50 |
| WO | WO-2007091222 A1 | * | 8/2007 | ............... B60D 1/52 |
| WO | WO-2012058732 A1 | * | 5/2012 | ............... B60D 1/64 |

\* cited by examiner

CHARGING ADAPTER AND MOBILE POWER SUPPLY

BACKGROUND

Technical Field

The present disclosure is directed to a charging adapter and is particularly, but not exclusively, directed to charging adapters for charging a mobile or permanent power supply in a vehicle with an electric vehicle charging station.

Description of the Related Art

Electric vehicles are drawing increasing interest because of their potential to reduce greenhouse gas emissions and the resulting negative environmental impact relative to conventional vehicles operated by gasoline or fossil fuels. The limited driving range of electric vehicles has resulted in an expanding network of electric vehicle charging stations. Recent developments have also focused on the batteries of electric vehicles being used as a power supply in the event of a loss of residential or commercial power, such as from a natural disaster. However, electric vehicles are expensive and may not be suitable or desirable for all users.

Typical vehicles with gas engines are not able to, or do not have a need to, utilize electric vehicle charging stations because the alternator of a conventional vehicle charges the battery while the vehicle is in motion. Further, the batteries of a conventional vehicle are not powerful enough or do not store enough energy to be used as a power supply in most circumstances. Nonetheless, the expanding network of electric vehicle charging stations presents an opportunity for conventional vehicles to utilize the charging network to provide some of the benefits of an electric vehicle at a significantly reduced cost relative to the purchase price of a new electric vehicle. It would therefore be beneficial to have a system for utilizing electric vehicle charging stations in conventional vehicles.

BRIEF SUMMARY

In one or more embodiments, a system that is mountable to a trailer hitch of a vehicle for receiving power from an electric vehicle charging station may be summarized as including: a hitch adapter assembly, including a tube structured to be received in the trailer hitch of the vehicle, a mounting plate coupled to the tube, and an electric vehicle socket coupled to the mounting plate and structured to receive power from the electric vehicle charging station; a power supply in the vehicle; and a wire coupled to the electric vehicle socket and structured to provide power to the power supply from the electric vehicle socket and the electric vehicle charging station.

The system may further include: the tube of the hitch adapter assembly including a first flange with a first protrusion extending from the first flange and a second flange with a second protrusion extending from the second flange, the first flange and the second flange spaced from the tube by a gap and being flexible to removably couple the first protrusion and the second protrusion in holes of the trailer hitch of the vehicle; the tube including a longitudinal axial bore through the tube and the mounting plate including a first hole aligned with the longitudinal axial bore of the tube, the wire passing through the first hole of the mounting plate and the longitudinal axial bore of the tube; the mounting plate including a plurality of second holes spaced around the first hole, the electric vehicle socket coupled to the mounting plate with fasteners received in the plurality of second holes; the first hole of the mounting plate being recessed with respect an outer surface of the mounting plate; the electric vehicle socket being removably coupled to the mounting plate, the hitch adapter assembly further including a standard electrical socket being replaceable with the electric vehicle socket, the wire structured to provide power from the power supply to the standard electrical socket; the power supply being a mobile power supply; and the power supply being a fixed power supply in the vehicle.

In one or more embodiments, a system may be summarized as including: a hitch assembly being coupleable to a trailer hitch of a vehicle, including a tube being coupleable to the trailer hitch of the vehicle with the tube received in the trailer hitch of the vehicle, a mounting plate coupled to the tube, and a socket removably coupled to the mounting plate; a power supply in the vehicle; and an electric cord coupled to the socket and the power supply, the electric cord configured to provide power from the socket to the power supply.

The system may further include: the socket being an electric vehicle socket coupleable to an electric vehicle charging station to provide power from the electric vehicle charging station to the power supply via the electric cord; the power supply in the vehicle being a mobile power supply in the vehicle; the socket including a first socket and a second socket each removably coupleable to the mounting plate, the first socket being an electric vehicle socket and the second socket being a standard electrical socket, the first socket structured to charge the power supply via the electric cord and the second socket structured to receive power from the power supply to power an external device; a transformer coupled to the electric cord between the socket and the power supply, the transformed structured to step 110V power up to 220V or to step down 220V power to 110V; a power adapter removably coupleable to the socket, the power adapter including an electric vehicle connector and a standard electrical outlet connector; and the power supply in the vehicle including a permanent battery and a standard electrical connector in electric communication with the permanent battery, the standard electrical connector coupled to the electric cord and configured to provide power from the socket to the permanent battery.

BRIEF DESCRIPTION OF THE SEVERAL VIEWS OF THE DRAWINGS

The present disclosure will be more fully understood by reference to the following figures, which are for illustrative purposes only. These non-limiting and non-exhaustive embodiments are described with reference to the following drawings, wherein like labels refer to like parts throughout the various views unless otherwise specified. The sizes and relative positions of elements in the drawings are not necessarily drawn to scale in some figures. For example, the shapes of various elements are selected, enlarged, and positioned to improve drawing legibility. In other figures, the sizes and relative positions of elements in the drawings are exactly to scale. The particular shapes of the elements as drawn may have been selected for ease of recognition in the drawings. The figures do not describe every aspect of the teachings disclosed herein and do not limit the scope of the claims.

DETAILED DESCRIPTION

Persons of ordinary skill in the art will understand that the present disclosure is illustrative only and not in any way limiting. Other embodiments of the presently disclosed system and method readily suggest themselves to such skilled persons having the assistance of this disclosure.

Each of the features and teachings disclosed herein can be utilized separately or in conjunction with other features and teachings to provide electric vehicle adapter and mobile power supply devices, systems, and methods. Representative examples utilizing many of these additional features and teachings, both separately and in combination, are described in further detail with reference to attached FIGS. 1-14. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present devices, systems and methods.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced, but are not intended to limit the dimensions and the shapes shown in the examples in some embodiments. In some embodiments, the dimensions and the shapes of the components shown in the figures are intended to limit the dimensions and the shapes of the components.

In general, the present disclosure is directed to a charging adapter that is coupleable to a trailer hitch of a vehicle. The charging adapter includes an electric vehicle connector for receiving power from an electric vehicle charging station as well as an electrical cord for transmitting the power to a power supply in the vehicle, such as a mobile power supply or a permanent battery in the vehicle. A user can charge the power supply using the charging adapter to provide power to a selected location, such as at a user's home in the event of a natural disaster, at a job site, or while camping, among a number of other potential uses. Thus, the concepts of the present disclosure enables conventional gas-powered vehicles to utilize of the expanding network of electric vehicle charging stations and provide some of the benefits of an electric vehicle at a fraction of the cost of an electric vehicle. Although the disclosure will use an example of a charging adapter for a trailer hitch of a truck, it is to be appreciated that the charging adapter may be used with a trailer hitch of another vehicle and the concepts of the present disclosure can also be applied to vehicles without a trailer hitch as well. Further, the adapter described herein may have a different structure than a trailer hitch adapter, such as a bike rack, a bumper plug, a license plate cover, a tail light, a head light (or other light), a socket or connector structure designed to be coupled to a vehicle (i.e., a mounting plate with a connector coupled to a bumper or other area of a vehicle) or any accessory or device that is removably or permanently coupleable to a vehicle. Thus, although the below description and enclosed drawings describe an adapter coupleable to a trailer hitch, the adapter may be any selected detachable adapter or accessory for a vehicle in some embodiments.

Figure 1:
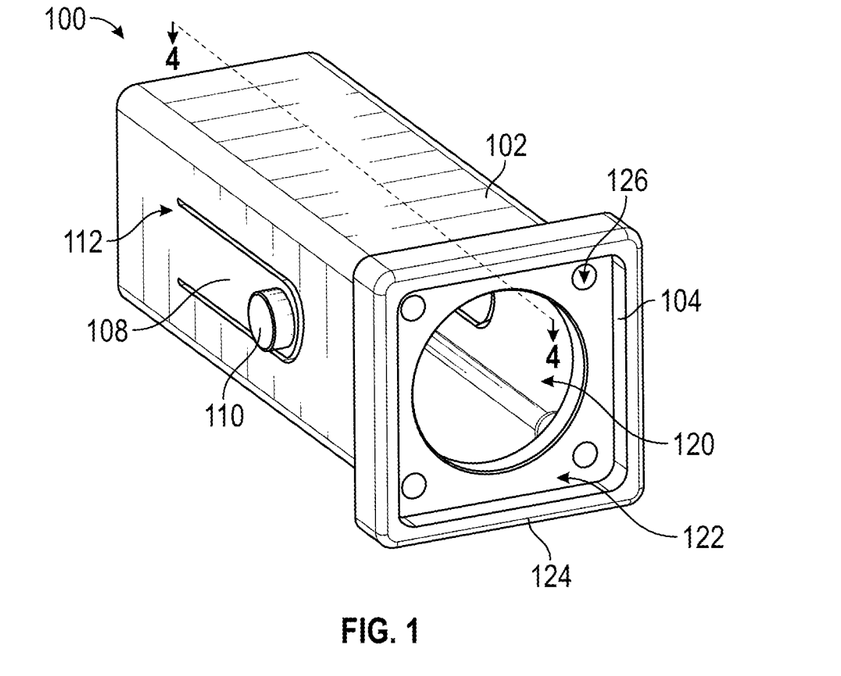
FIG. 1 is a front isometric view of an embodiment of a tube and a mounting plate of a charging adapter mountable to a trailer hitch according to the present disclosure.
Figure 2:
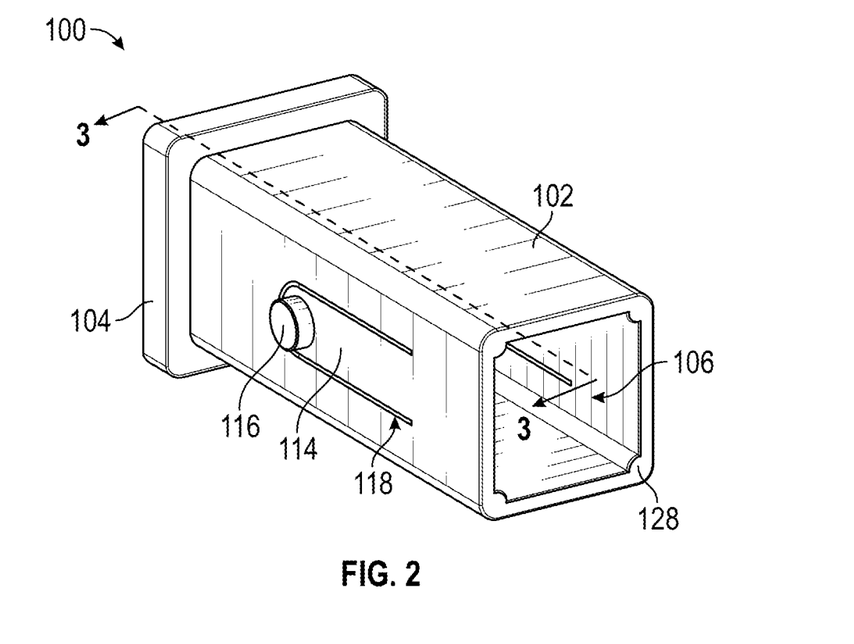
FIG. 2 is a rear isometric view of the charging adapter of FIG. 1.

FIG. 1 is a front isometric view of an embodiment of a charging adapter 100 and FIG. 2 is a rear isometric view of the charging adapter 100. With reference to FIG. 1 and FIG. 2, the charging adapter 100 includes a tube 102 and a mounting plate 104 coupled to the tube 102. In some embodiments, the tube 102 and the mounting plate 104 are a single, integral, unitary structure. In other embodiments, the tube 102 and the mounting plate 104 may be separate components coupled together with fasteners or an adhesive. The tube 102 may have an elongated rectangular shape adapted to be received into a standard trailer hitch of a vehicle, such as a 2 inch or a 2.5 inch trailer hitch in some embodiments. The tube 102 is hollow with a longitudinal axial bore 106 through the tube 102. As shown in FIG. 1, the mounting plate 104 may have a square shape, although the shape of the mounting plate 104 and the tube 102 may be selected to be a different shape in some embodiments.

The tube 102 includes a first flange 108 located along a left sidewall of the tube 102 with a first protrusion 110 extending from the first flange 108. The first flange 108 is spaced from the tube 102 by a first air gap 112 such that the first flange 108 is flexible or movable to manipulate the first protrusion 110. The first protrusion 110 is structured to be removably received in a hole in the trailer hitch of the vehicle to removably couple the charging adapter 100 to the trailer hitch. Similarly, the tube 102 includes a second flange 114 located along a right sidewall of the tube 102 with a second protrusion 116 extending from the second flange 114.

The second flange 114 is also spaced from the tube 102 by a second air gap 118 such that the second flange 114 is flexible or movable to manipulate the second protrusion 116. The second protrusion 116 is structured to be removably received in a hole in the trailer hitch of the vehicle to removably couple the charging adapter 100 to the trailer hitch. In some embodiments, the adapter 100 may include only one flange and protrusion, or may replace the flange and protrusions with holes through the tube 102 for receiving a trailer hitch pin to couple the adapter 100 to the trailer hitch.

The mounting plate 104 includes a first hole 120 through the plate 104 that is in communication with the axial bore 106 through the tube 102. The first hole 120 may be located centrally with respect to the plate 104 and may have a size and a shape that corresponds to a size and a shape of a socket coupled to the mounting plate 104, as described below. In some embodiments, the first hole 120 extends through an outer surface 122 of the mounting plate 104 that is recessed relative to an outer edge 124 of the mounting plate 104. Thus, the first opening 120 is recessed relative to the outer edge 124 of the mounting plate 104 to receive a socket with the socket being planar with the outer edge 124 of the mounting plate 104 in some embodiments. Alternatively, the socket may extend beyond the outer edge 124 depending on the type and size of the socket.

The mounting plate 104 further includes a plurality of second holes 126 through the outer surface 122 that receive fasteners for coupling the mounting plate 104 to the tube 102 or the socket to the mounting plate 104, or both. In some embodiments, the plurality of second holes 126 include four holes spaced equidistant from each other about the first hole 120, although the same is not necessarily required and the mounting plate 104 may include any selected number of second holes 126 in any selected position on the mounting plate 104 or any position relative to the first hole 120. Further, the second holes 126 may have a smaller diameter than a diameter of the first hole 120 in some embodiments. As shown in FIG. 2, tube 102 may also include ribs 128 formed as a thicker portion of the sidewalls of the tube 102 at corners of the tube 102 to provide additional support for the tube 102 and rounded outer corners or edges of the tube 102. The ribs 128 may extend along an entire length of the tube 102 in some embodiments, or may extend along only a portion of the tube 102 in some embodiments.

Figure 3:
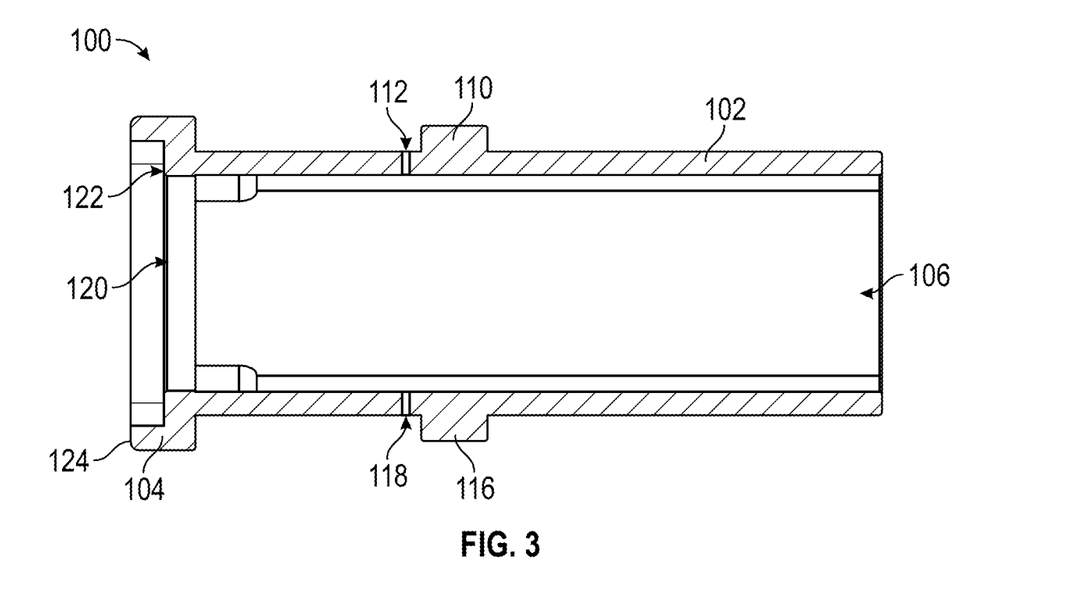
FIG. 3 is a cross-sectional view of the charging adapter along line A-A in FIG. 1.

Turning to FIG. 3, illustrated therein is a cross-sectional view of the charging adapter 100 along line A-A in FIG. 1 providing additional detail regarding the tube 102 and the mounting plate 104. Specifically, FIG. 3 illustrates the axial bore 106 of the tube 102 extending along a complete length of the tube 102 with the first hole 120 in the outer surface 122 of the mounting plate 104 leading into and in communication with the axial bore 106 of the tube 102. Further, FIG. 3 shows the outer surface 122 of the mounting plate 104 being recessed relative to the outer edge 124 of the mounting plate 102 as well as the air gaps 112, 118 in the sidewalls of the tube 102 around the flanges 108, 112. In some embodiments, the protrusions 110, 116 and flanges 108, 112 may be replaced with buttons or other like devices that can be depressed to removably couple the adapter 100 to the trailer hitch of the vehicle. The mounting plate 104 may also have a width that is greater than a width of the tube 102, as shown in FIG. 3 with the outer edge 124 of the mounting plate 104 extending beyond an outer edge or surface of the tube 102. As such, the mounting plate 104 prevents the tube 102 from sliding too far into the trailer hitch as well as providing a larger area for receiving a socket of the type described herein.

Figure 4:
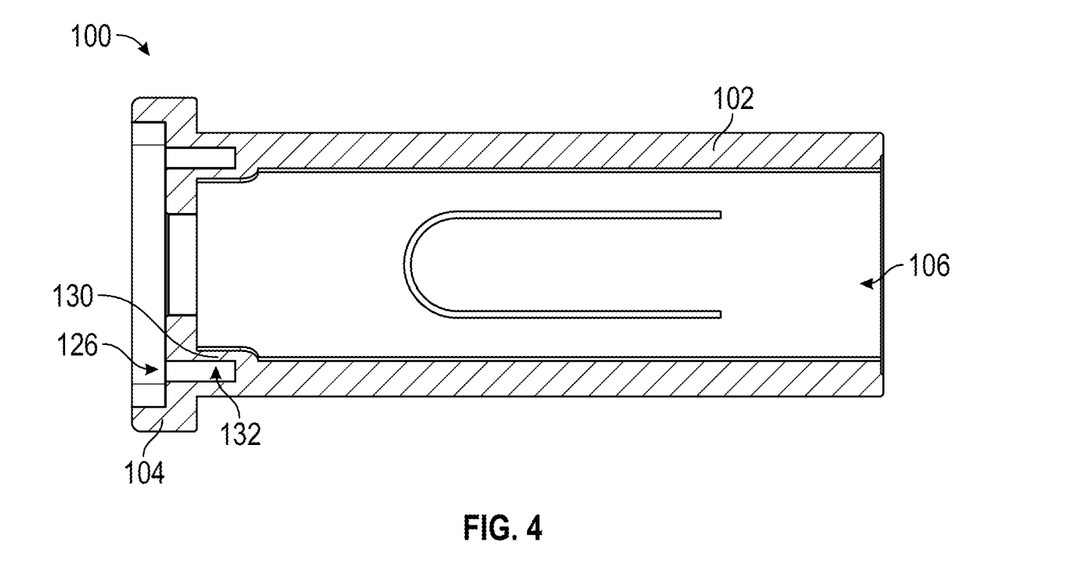
FIG. 4 is a cross-sectional view of the charging adapter along line B-B in FIG. 2.

FIG. 4 illustrates an additional cross-sectional view of the adapter 100 along line B-B in FIG. 2. In some embodiments, the tube 102 includes receptacles 130 extending from sidewalls of the tube 102 into the axial bore 106 proximate the mounting plate 104 and an axial bore or hole 132 extending into each receptacle 130 for receiving a fastener through the second holes 126 of the mounting plate 104. The axial bore 132 does not extend entirely through the receptacles, but rather, extends a selected length corresponding to a length of the fasteners for coupling the socket to the adapter 100. The receptacles 130 may be an extension of the ribs 128 shown in FIG. 2 in one or more embodiments, such that the ribs 128 lead to the receptacles 130.

Figures 5, 6:
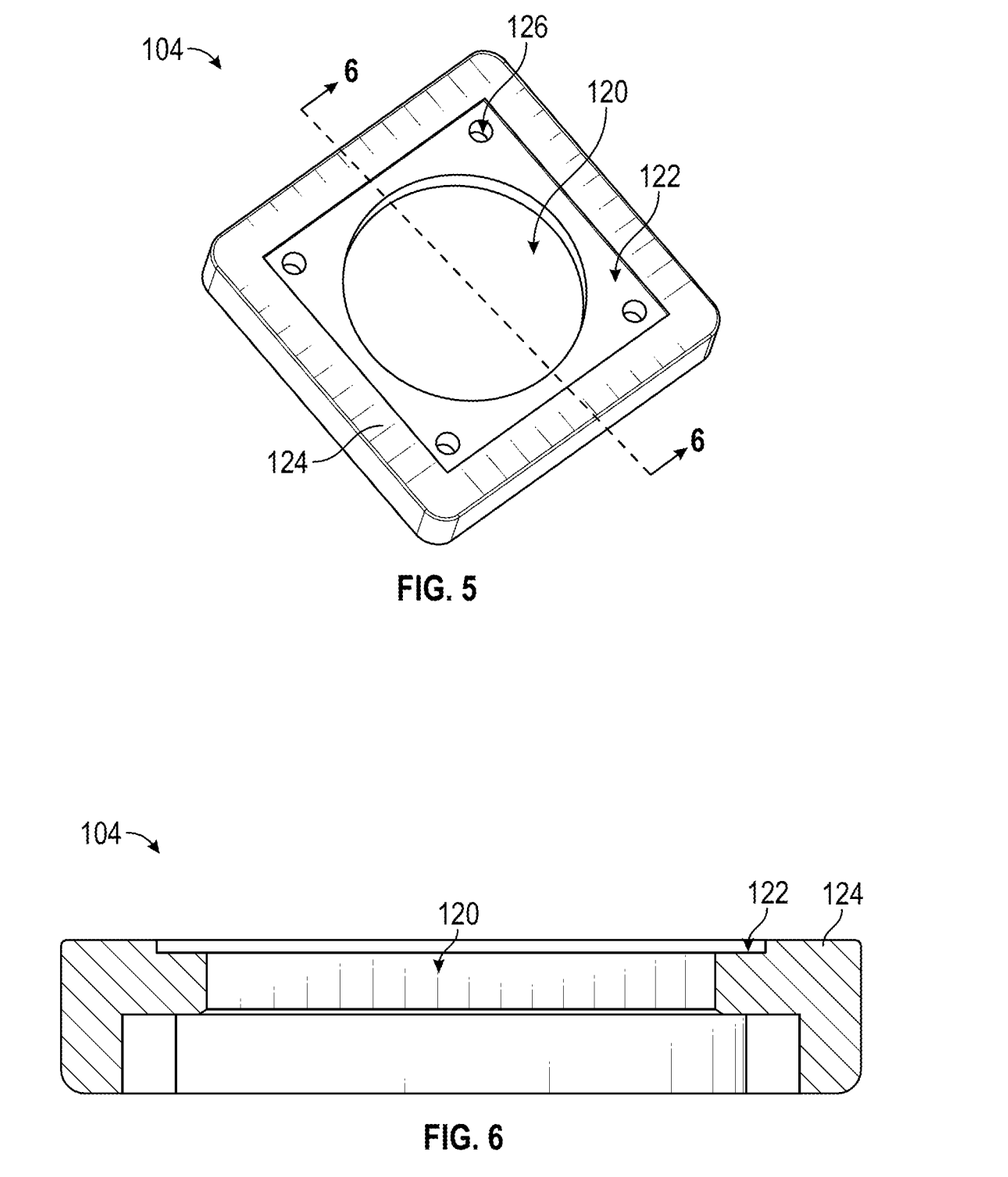
FIG. 5 is an isometric view of the mounting plate of FIG. 1.
FIG. 6 is a cross-sectional view of the mounting plate along line C-C in FIG. 5.

FIG. 5 is an isometric view of the mounting plate 104 and FIG. 6 is a cross-sectional view of the mounting plate 104 along line C-C in FIG. 5. In some embodiments, the tube 102 and the mounting plate 104 may be plastic formed by different molding techniques, such as casting, blow molding, injection molding, rotational molding, and compression molding, among others. The tube 102 and the mounting plate 104 may also be formed of any other selected material, such as metal, in which case the mounting plate 104 may be welded to the tube 102. The tube 102 and the mounting plate 104 may also be formed by 3D printing using any selected material, as in the embodiment of the mounting plate 104 illustrated in FIG. 5 and FIG. 6.

In the mounting plate 104 illustrated in FIG. 5 and FIG. 6, the outer surface 122 is less recessed relative to the outer edge 124 of the mounting plate 104. In some embodiments, the outer surface 122 may be planar with the outer edge 124 of the mounting plate 104. Further, the mounting plate 104 may be removably coupled to the tube 102 and replaceable with different mounting plate embodiments or the mounting plate 104 may be permanently and irreversibly coupled to the tube 102 in some embodiments. For example, the mounting plate 104 may be replaced by a mounting plate adapted to receive a standard electrical connector of the type described herein instead of an electric vehicle connector. The mounting plate 104 may also include the second holes 126 positioned closer to the outer edge 124 of the mounting plate 124 than to the first hole 120 through the mounting plate 104 in some embodiments. As shown in FIG. 6, the mounting plate 104 includes the first hole 120 having a diameter less than a width between inner surfaces of sidewalls of the mounting plate 104.

Figure 7:
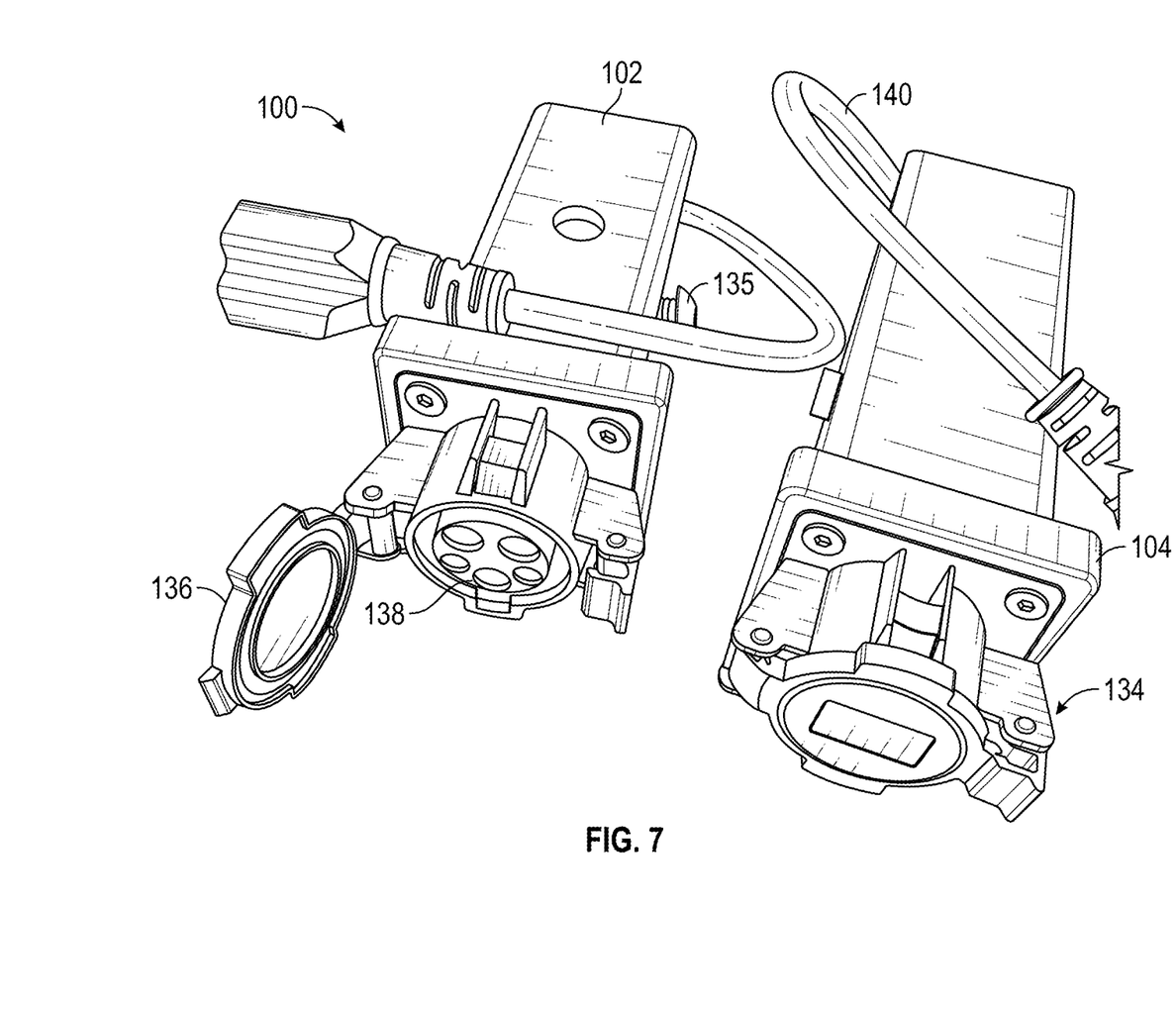
FIG. 7 is a photograph of an electric vehicle socket coupled to the mounting plate of the charging adapter of FIG. 1.

FIG. 7 is a photograph of an electric vehicle socket 134 coupled to the mounting plate 104 to complete the charging adapter 100 of FIG. 1. The electric vehicle socket 134 may also be referred to herein as an electric vehicle connector 134 or an electric charging inlet 134. As shown in FIG. 7, the electric vehicle socket 134 includes a cover 136 coupled to the socket 134 to selectively provide access to a connector 138 of the socket 134. The connector 138 is structured to be coupled to an electric vehicle charging station, or more specifically, the connector 138 is structured to receive a male connector of an electric vehicle charging station and establish an electrical connection with the electric vehicle charging station. The socket is electrically connected to a power cord or wire 140 for transferring power from the socket 134 to the locations described herein. When the socket 134 is coupled to the mounting plate 104, the cord 140 passes through the first opening 120 in the mounting plate 104 and through the axial bore 106 of the tube 102 (see FIG. 3). In some embodiments, the socket 134 may be a Type 1 J1772

EV socket 32 amp charging inlet manufactured by Duosida. However, the socket 134 may also be any other type of electric vehicle socket or connector now known or developed in the future, as well as other types of electric connectors, as described herein. The connector 138 of the socket 134 may include resistors that provide a resistance between two connections in the socket 134 during operation in order to convey to the electric vehicle charging station that the socket 134 is associated with an electrical vehicle. When a power supply connected to the socket 134 is full, the socket 134 disables the resistance and the charging station terminates the supply of power to the socket 134. The socket 134 may also comply with various standards covering electric vehicle charging connectors.

Figure 8:
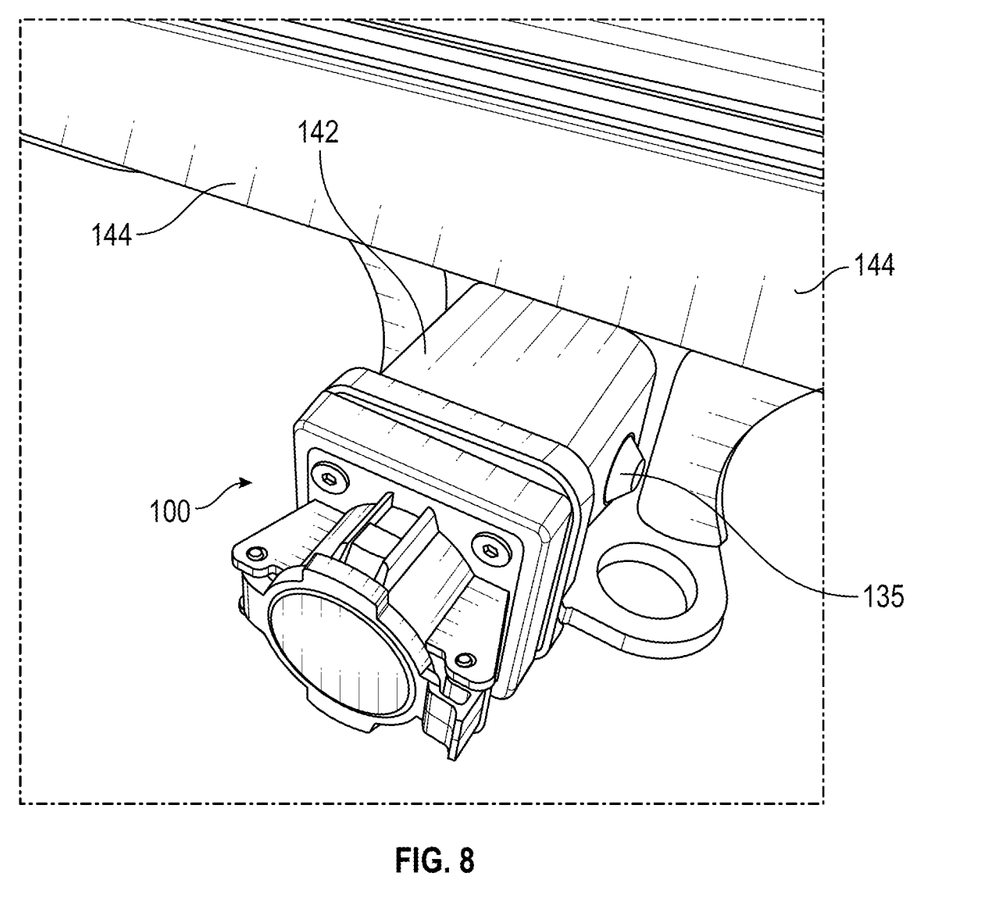
FIG. 8 is a photograph of the charging adapter of FIG. 7 coupled to a trailer hitch of a vehicle.

In some embodiments, the tube 102 includes a different structure for coupling to the trailer hitch of a vehicle. For example, as shown in FIGS. 7 and 8, the tube 102 may include holes in sidewalls of the tube that align with corresponding holes in the trailer hitch of the vehicle. A fastener 135, such as a screw, bolt, or other threaded device in some non-limiting examples, is threaded through the holes in the tube 102 and the holes in the trailer hitch and secured with a nut or other receiving device on the opposite side of the tube 102. The nut or receiving device may be permanently coupled to the tube 102 or may be an external structure.

FIG. 8 is a photograph of the charging adapter 100 coupled to a trailer hitch 142 of a vehicle 144. As described above, the protrusions 110, 116 of the tube 102 (FIG. 3) are removably coupled to holes in the trailer hitch 142 to couple the adapter 100 to a standard vehicle, such as vehicle 144 in FIG. 8. The present disclosure also contemplates incorporation of the socket 134 in other locations than the trailer hitch 142 of the vehicle 144, such as into a bumper or side panels of the vehicle 144.

Figure 9:
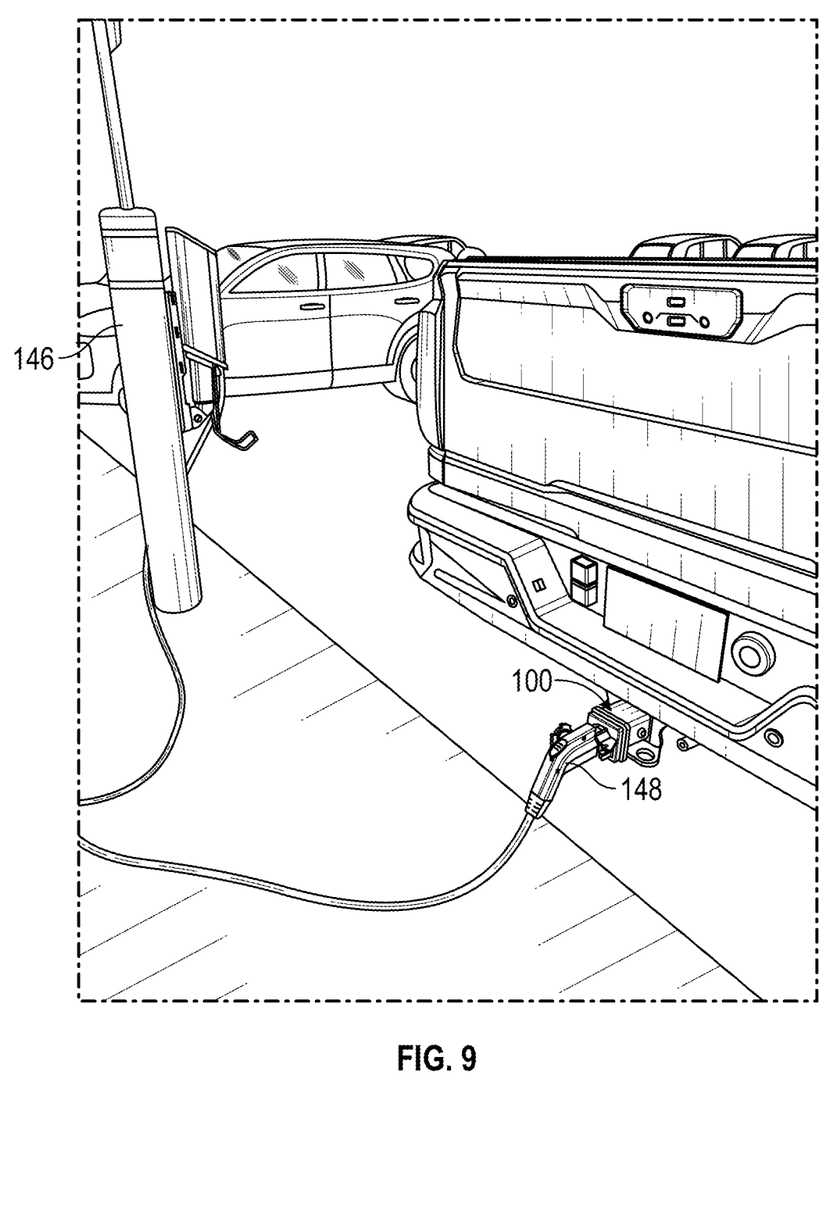
FIG. 9 is a photograph of the charging adapter of FIG. 7 connected to an electric vehicle charging station.

FIG. 9 is a photograph of the charging adapter 100 connected to an electric vehicle charging station 146. The electric vehicle charging station 146 includes a standard electric vehicle charging connector 148 with the socket 134 adapted to receive the connector 148. Thus, in operation, the user couples the charging adapter 100 to the trailer hitch of their vehicle, as described above, and then connects the connector 148 of the charging station 146 to the socket 134 to begin charging a power supply, as described below.

Figure 10:
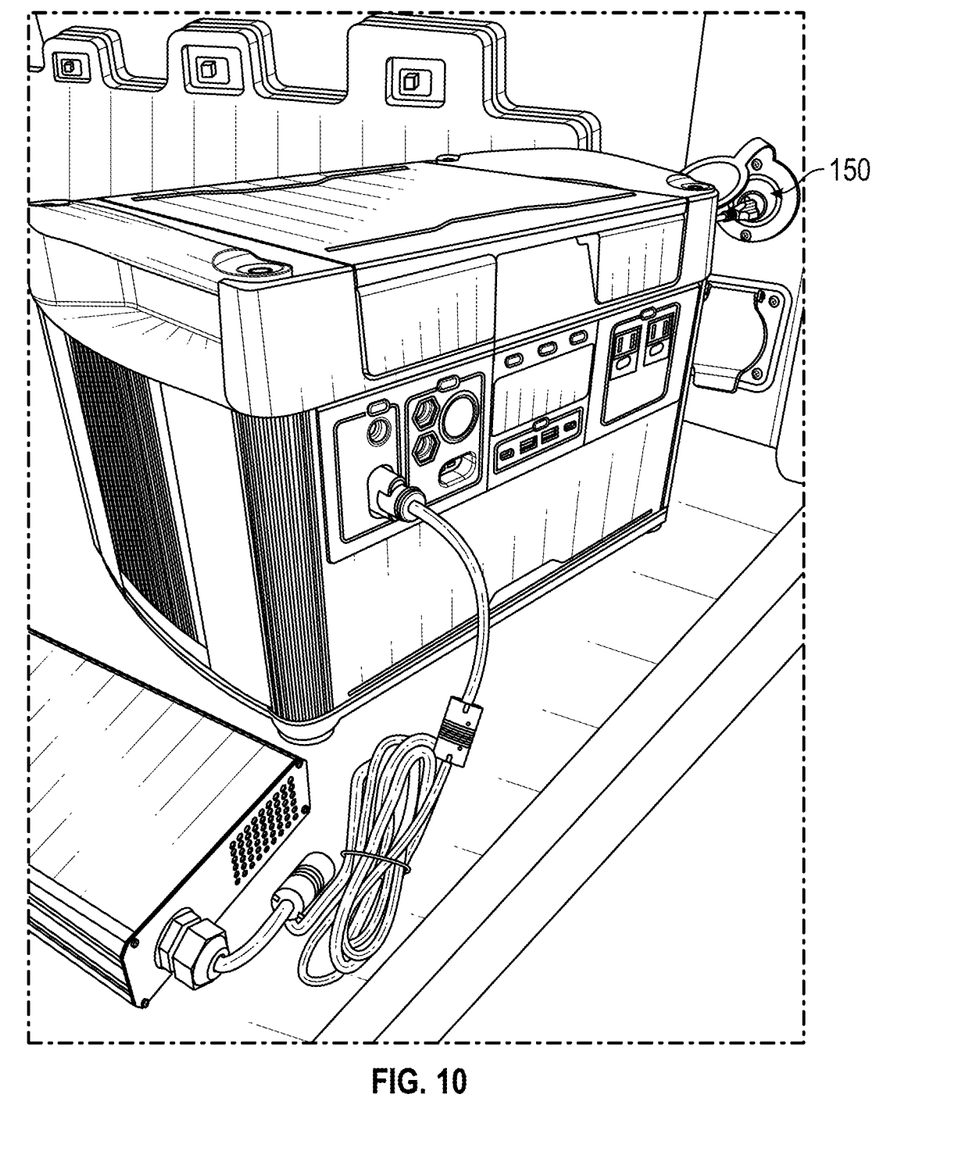
FIG. 10 is a photograph of a mobile power supply connected to the charging adapter of FIG. 7.
Figure 11:
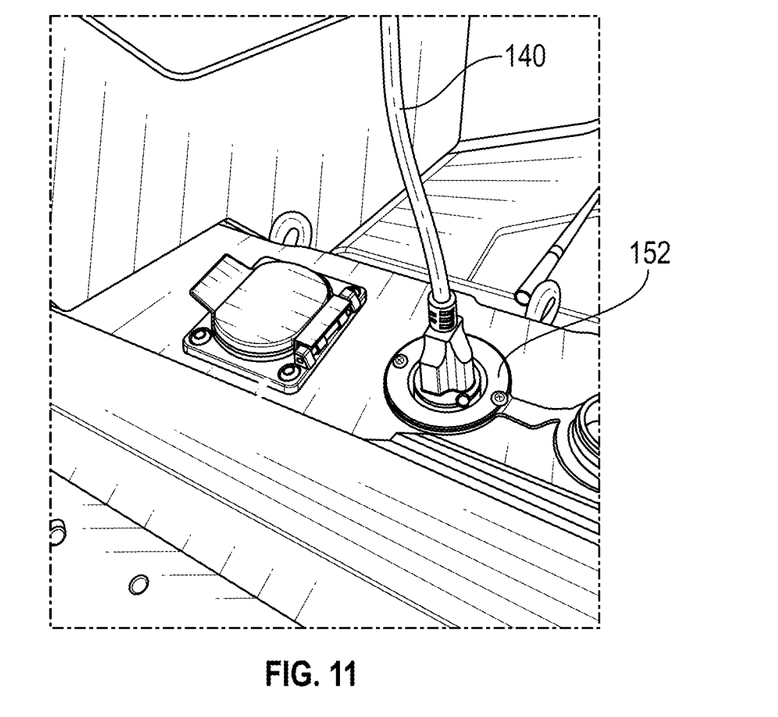
FIG. 11 is a photograph of the charging adapter of FIG. 7 connected to an electrical socket in the vehicle.

FIG. 10 is a photograph of a mobile power supply 150 electrically connected to the charging adapter 100 described herein. In particular, the power cord 140 of the adapter 100 (FIG. 7) may be electrically connected to the mobile power supply 150 with the adapter 100 connected to the electric vehicle charging station 146 (FIG. 9) to charge the power supply 150. Although the power supply 150 is illustrated as being in a truck bed in FIG. 10, the power supply 150 may be freely movable and may be positioned at any suitable location in a vehicle. The power supply 150 can be selected from any number of power supplies now know or developed in the future. Once charged, the power supply 150 can be used to supply power in a remote location, such as a job site or while camping, in addition to providing power in the event of a residential power outage. Thus, the power supply 150 enables users without an electric vehicle to achieve some of the benefits of an electric vehicle and the growing network of electric vehicle charging stations at a fraction of the cost. In a preferred embodiment, the power supply 150 or other accessory is securely stored inside the vehicle, such as in a truck bed or in a trunk in some non-limiting examples, with the various connectors and electrical lines described herein transferring power from the power station to the power supply 150. This arrangement enables the user to charge the power supply 150 while the vehicle is unattended with lower security or theft risks relative to connecting the charging station to the power supply 150 directly (i.e., with the vehicle open).

In some embodiments, the power supply 150 may also be fixed power supply, such as the vehicle's battery. For example, in FIG. 11, the power supply 150 is a fixed or permanent power supply, such as a vehicle's battery or a fixed battery bank in the vehicle, and the power cord 140 of the charging adapter 100 (FIG. 7) is connected to a standard electrical connector 152 in the vehicle. The electrical connector 152 may be a standard electrical connector or socket according to different international standards. The adapter 100 then provides power, via the electric vehicle charging station 146 (FIG. 9) to the permanent power supply to achieve the technological improvements discussed above, or to recharge the vehicle's battery, or both. Further, although the electrical connector 152 may generally be fixed to the vehicle in some embodiment, the adapter 100 is removably coupleable to the trailer hitch. In some embodiments, the cable, electrical cord, or wire between the connector 152 and the adapter 100 has a disconnect in some embodiments to enable the user to separate the adapter 100 from the connector 152 and remove the adapter 100 to use the trailer hitch for a different purpose.

Figure 12:
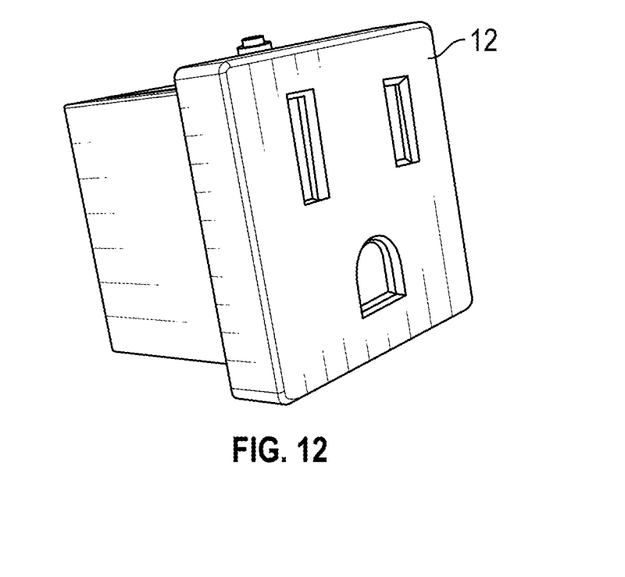
FIG. 12 is a photograph of a standard electrical socket coupleable to the charging adapter of FIG. 7.
Figure 13:
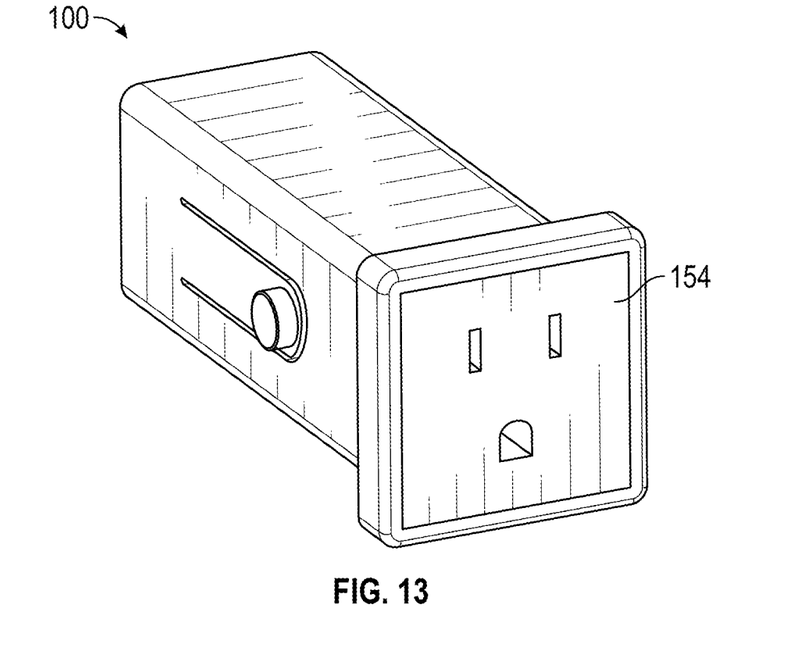
FIG. 13 is an isometric view of the standard electrical socket coupled to the charging adapter of FIG. 1.

FIG. 12 is a photograph of a standard electrical socket 154 coupleable to the charging adapter 100 and FIG. 13 is an isometric view of the standard electrical socket 154 coupled to the charging adapter 100 instead of the electric vehicle socket 134 (FIG. 7). In some embodiments, the electric vehicle charging socket 134 is removably coupled or replaceably coupled to the adapter 100, meaning that the electric vehicle socket 134 can be replaced by other sockets. In one non-limiting example, the adapter 100 may include a standard electric socket 154 coupleable to the adapter 100. The standard electric socket 154 may be coupled to the adapter 100 to enables a user to charge the power supply 150 (FIG. 10) with a conventional power source, such as a residential power outlet. In addition, the standard electric socket 154 enables the use of power in the power supply 150 (FIG. 10) with a wider range of devices that have a standard electrical connector. For example, once the power supply 150 (FIG. 10) is charged, the user may replace the electric vehicle socket 134 (FIG. 7) with the standard electrical socket 154 in FIG. 12 and FIG. 13 by removing the fasteners in the second holes 126 in the mounting plate 104 of the adapter 100, switching the sockets 134, 154, and replacing the fasteners in the second holes 126. Then, a user can output power from the power supply 150 (FIG. 10) for use with devices that have a standard electrical connector.

As noted above, the standard electrical socket 154 may be a standard connector according to different international standards, such as a connector of the type utilized in the United States or Europe, among many others. Further, both sockets 134, 154 may be sold with the adapter 100 in a kit, or the socket 154 may be an adapter that has one end with an electrical vehicle connector and one end with a standard electrical connector so that the socket 154 plugs into the socket 134. In some embodiments, the adapter 100 may further include a transformer for stepping power up or down from the various power sources described herein. For example, where the power supply 150 (FIG. 10) is structured to receive and output 110V power but the electric vehicle charging station 146 (FIG. 9) outputs 220V power, a step down transformer for converting the 220V power to 110V power may be electrically connected between the adapter 100 and the power supply 150 (FIG. 10). Similarly, the transformer may be a step up transformer for converting input 110V power to 220V power. The above examples of stepping up and stepping down power from 110V to 220V are non-limiting and in practice, the transformer may be selected based on the desired input and output voltage. For example, the charging station 146 may output power at a different voltage than 220V, such as 110V or others, and a transformer may be selected accordingly for conversion of the power from the station 146 to a voltage appropriate for the intended use. Thus, the disclosure expressly contemplates receiving, storing, converting, and outputting voltages more than, less than, and in between 110V and 220V.

Figure 14:
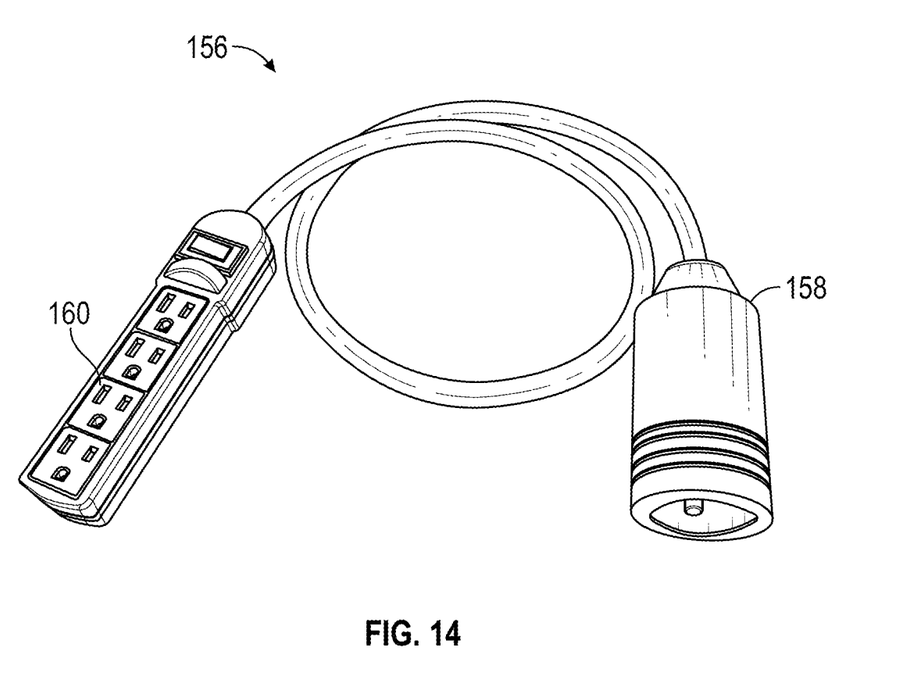
FIG. 14 is a photograph of a charging adapter with a electric vehicle connector and a standard electrical connector.

FIG. 14 is a photograph of a charging adapter 156 with an electric vehicle connector 158 and a standard electrical connector 160 at opposite ends of the adapter 156. The electric vehicle connector 158 of the adapter 156 may be coupled to the electric socket 134 with the standard electrical connector 160 providing a connection point for devices with standard electrical connectors. Thus, the adapter 156 enables for power to be output from the power supply 150 to devices with standard electrical connectors without changing the sockets 134, 154 or disconnecting the adapter 100 from the vehicle.

In view of the above, the present disclosure is directed to a charging adapter that is coupleable to a trailer hitch of a vehicle for transmitting power from an electrical vehicle charging station to a mobile or fixed power supply in the vehicle. A user can charge the power supply using the charging adapter to provide power to a selected location at a selected point in time, such as at a user's home in the event of a loss of power, at a job site, or while camping, among a number of other potential uses and benefits. Thus, the concepts of the present disclosure enables conventional gas-powered vehicles to utilize the expanding network of electric vehicle charging stations and provide some of the benefits of an electric vehicle at a fraction of the cost of an electric vehicle.

Certain words and phrases used in the specification are set forth as follows. As used throughout this document, including the claims, the singular form "a", "an", and "the" include plural references unless indicated otherwise. Any of the features and elements described herein may be singular, e.g., a sensor may refer to one sensor and a memory may refer to one memory. The terms "include" and "comprise," as well as derivatives thereof, mean inclusion without limitation. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Other definitions of certain words and phrases are provided throughout this disclosure.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the present disclosure.

Generally, unless otherwise indicated, the materials for making the invention and/or its components may be selected from appropriate materials such as metal, metallic alloys (high strength alloys, high hardness alloys), composite materials, ceramics, intermetallic compounds, plastic, 3D printable materials, and the like.

Unless the context clearly dictates otherwise, the term "non-electric vehicle" means a vehicle with a motor that is powered by any source or type of fuel other than a rechargeable battery. In other words, "non-electric vehicle" means any vehicle that is not a plug-in electric vehicle. Thus, while a non-electric vehicle may include a rechargeable battery and any number of known electrical systems, "non-electric" refers specifically to the type of engine and fuel utilized by the vehicle to produce motion. As used herein, a "non-electric vehicle" includes, but is not limited to, vehicles with engines powered by fossil fuels, vehicles with engines powered by alternative fuels (i.e., fuels other than fossil fuels), hybrid vehicles, and the like, or any combination thereof.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described embodiments, but should be defined only in accordance with the following claims and their equivalents.

The invention claimed is:

1. A system mountable to a trailer hitch of a vehicle for receiving power from an electric vehicle charging station, comprising:
a hitch adapter assembly, including:
a tube structured to be received in the trailer hitch of the vehicle;
a mounting plate coupled to the tube; and
an electric vehicle socket removably coupled to the mounting plate and structured to receive power from the electric vehicle charging station;
a power storage device in the vehicle; and
a wire coupled to the electric vehicle socket and structured to provide power to the power storage device from the electric vehicle socket and the electric vehicle charging station.

2. The system of claim 1 wherein the tube of the hitch adapter assembly includes a first flange with a first protrusion extending from the first flange and a second flange with a second protrusion extending from the second flange, the first flange and the second flange spaced from the tube by a gap and being flexible to removably couple the first protrusion and the second protrusion in holes of the trailer hitch of the vehicle.

3. The system of claim 1 wherein the tube includes a longitudinal axial bore through the tube and the mounting plate includes a first hole aligned with the longitudinal axial bore of the tube, the wire passing through the first hole of the mounting plate and the longitudinal axial bore of the tube.

4. The system of claim 3 wherein the mounting plate includes a plurality of second holes spaced around the first hole, the electric vehicle socket coupled to the mounting plate with fasteners received in the plurality of second holes.

5. The system of claim 3 wherein the first hole of the mounting plate is recessed with respect an outer surface of the mounting plate.

6. The system of claim 1 wherein the hitch adapter assembly further includes a standard electrical socket being replaceable with the electric vehicle socket, the wire structured to provide power from the power storage device to the standard electrical socket.

7. The system of claim 1 wherein the power storage device is a mobile power supply.

8. The system of claim 1 wherein the power storage device is a fixed power supply in the vehicle.

9. A system, comprising:
a hitch assembly being removably coupleable to a trailer hitch of a vehicle, including:
a tube being removably coupleable to the trailer hitch of the vehicle, the tube being receivable in the trailer hitch of the vehicle;
a mounting plate coupled to the tube; and
a socket removably coupled to the mounting plate;
a power storage device in the vehicle; and
an electric cord coupled to the socket and the power storage device, the electric cord providing an electrical connection between the socket and the power storage device.

10. The system of claim 9 wherein the socket is an electric vehicle socket coupleable to an electric vehicle charging station to provide power from the electric vehicle charging station to the power storage device via the electric cord.

11. The system of claim 9 wherein the power storage device in the vehicle is a mobile power storage device in the vehicle.

12. The system of claim 9 wherein the socket includes a first socket and a second socket each removably coupleable to the mounting plate, the first socket being an electric vehicle socket and the second socket being a standard electrical socket, the first socket including electrical connectors that charge the power storage device via the electric cord, and the second socket including electrical connectors that receive power from the power storage device to power an external device.

13. The system of claim 9 further comprising:
a transformer coupled to the electric cord between the socket and the power storage device, the transformed structured to step 110V power up to 220V or to step down 220V power to 110V.

14. The system of claim 9 further comprising:
a power adapter removably coupleable to the socket, the power adapter including an electric vehicle connector and a standard electrical outlet connector.

15. The system of claim 9 wherein the power storage device in the vehicle includes a permanent battery and a standard electrical connector in electric communication with the permanent battery, the standard electrical connector coupled to the electric cord and providing an electrical connection from the socket to the permanent battery.

16. A system, comprising:
an adapter assembly being coupleable to a non-electric vehicle, including:
a mounting plate being coupleable to the non-electric vehicle; and
an electric vehicle socket removably coupled to the mounting plate;
a power storage device in the non-electric vehicle; and
an electric cord removably coupled to the socket of the adapter assembly and the power storage device, the electric cord providing an electrical connection between the socket and the power storage device.

17. The system of claim 16 wherein the power storage device is separate from a battery of the non-electric vehicle.

18. The system of claim 16 wherein the adapter assembly further includes a tube being coupleable to a trailer hitch of the non-electric vehicle, the mounting plate coupled to the tube.

* * * * *